United States Patent
Castellon

(10) Patent No.: US 7,604,428 B2
(45) Date of Patent: Oct. 20, 2009

(54) MOUNTING ASSEMBLY FOR DRIVE SHAFTS IN UNIVERSAL JOINT YOKES

(76) Inventor: Melchor Daumal Castellon, Diputactón, 455-457, E-08013 Barcelona (ES)

( * ) Notice: Subject to any disclaimer, the term of this patent is extended or adjusted under 35 U.S.C. 154(b) by 631 days.

(21) Appl. No.: 11/085,513

(22) Filed: Mar. 22, 2005

(65) Prior Publication Data
US 2006/0045611 A1    Mar. 2, 2006

(30) Foreign Application Priority Data
Aug. 24, 2004  (ES)  ................... 200402078

(51) Int. Cl.
*F16B 7/04*  (2006.01)
(52) U.S. Cl. .................. 403/289; 403/370
(58) Field of Classification Search .......... 403/289, 403/290, 367, 368, 370; 411/339, 351, 336
See application file for complete search history.

(56) References Cited

U.S. PATENT DOCUMENTS

| | | | | |
|---|---|---|---|---|
| 4,900,178 A * | 2/1990 | Haldric et al. | ........... | 403/24 |
| 5,165,817 A * | 11/1992 | Hoblingre et al. | ........... | 403/373 |
| 5,358,350 A * | 10/1994 | Oertle | ........... | 403/12 |
| 5,380,118 A * | 1/1995 | Stahlecker et al. | ........... | 403/343 |
| 5,813,788 A * | 9/1998 | Yamamoto et al. | ........... | 403/57 |
| 6,135,667 A * | 10/2000 | Debisschop | ........... | 403/290 |
| 6,155,739 A * | 12/2000 | Sekine et al. | ........... | 403/12 |
| 6,350,078 B1 | 2/2002 | Butkievich et al. | | |
| 6,443,650 B2 * | 9/2002 | Ikeda | ........... | 403/12 |
| 6,565,446 B2 * | 5/2003 | Oka et al. | ........... | 464/89 |
| 6,575,658 B2 * | 6/2003 | Daniel et al. | ........... | 403/316 |

* cited by examiner

*Primary Examiner*—Daniel P Stodola
*Assistant Examiner*—Joshua T Kennedy
(74) *Attorney, Agent, or Firm*—Blank Rome LLP

(57) ABSTRACT

A mounting assembly for a universal joint that includes a yoke with wings between which a driving shaft is provided. The wings have respective holes. A bolt having a head and a stem is transversely to the wings. A sleeve receives the stem of the bolt so that, in an assembled position, the sleeve exerts a pressure on a surface of the driving shaft preventing its axial movement, wherein the stem has at least a first, threaded end portion, a second, non-threaded adjacent portion, and a third portion. The diameter of the second portion is slightly larger than an inner diameter of the sleeve. The third portion has a diameter slightly larger than the second portion. When the bolt is inserted into the sleeve, the sleeve expands resulting in an increase of its outer dimensions against the surface of the driving shaft blocking it axially in position as it is pressed against the yoke. The third portion of the bolt is received in one of the holes, thereby seating the bolt with respect to the yoke.

7 Claims, 1 Drawing Sheet

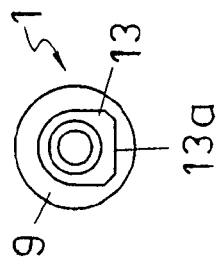
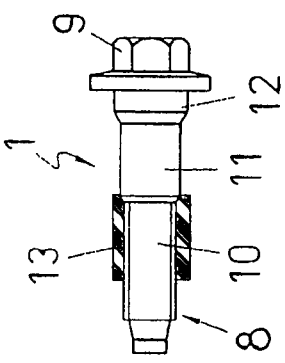
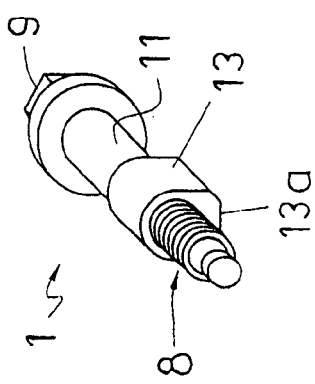
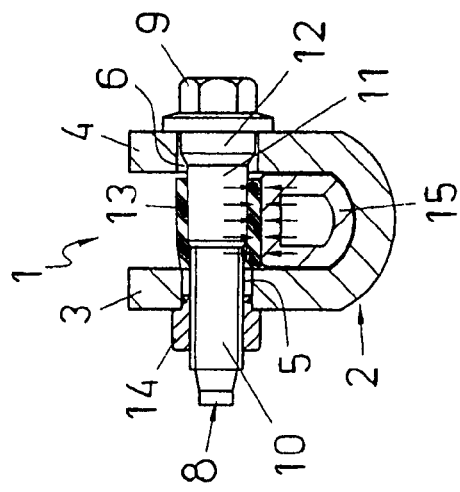
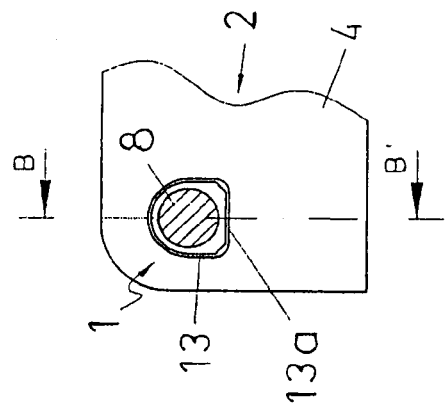
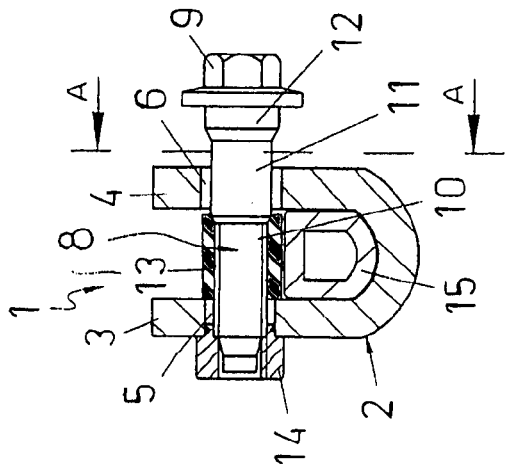

MOUNTING ASSEMBLY FOR DRIVE SHAFTS IN UNIVERSAL JOINT YOKES

RELATED APPLICATION

This application claims the benefit of Spanish Patent Application No. 200402078, filed on Aug. 24, 2004, the subject matter of which is hereby incorporated by reference.

FIELD OF THE INVENTION

The present invention relates to a mounting assembly for drive shafts in universal joint yokes which new features provide many advantages, as it will be fully disclosed in the present specification.

BACKGROUND OF THE INVENTION

Universal joints enable rotary motion of two shafts arranged at different relative directions to be transmitted with the purpose of providing angular displacement between both shafts. Said devices are used typically (although not exclusively) in the field of motor vehicles to transmit rotary motion to the wheels when they are both driving and steered wheels at the same time, as well as in the steering columns in motor vehicles wherein motion is not possible to be transmitted through a single piece longitudinal shaft, especially due to the particular geometry of the interior of the motor vehicle where different mechanical parts of steering assembly are to be fitted and operated.

Mounting assemblies for fastening a driving shaft in such universal joints into yokes of said joints are known in the art. Said yokes have an open, usually U-shaped, configuration, in which wings respective holes are provided for receiving a clamp bolt.

Examples of said mounting assembly may be found in the state of the art, such as in the U.S. Pat. No. 6,350,078 which discloses a retaining member for the shaft of a joint in a steering column assembly of a motor vehicle. The retaining member is inserted into the stem of a bolt that is screwed up into in the holes of the yoke, transversely to the driving shaft. The retaining member is a cylindrical body that covers the whole bolt stem and that has a deformable outer surface in the form of circumferential or helical ridges radially projecting away from the outer surface thereof. When inserting the bolt into the sleeve an interference between the fins and the surface of the driving shaft takes place, thus causing that said fins become deformed.

The main disadvantage of this state of art mounting assembly is that the pressure exerted on the driving shaft by interference of such circumferential or helical fins does not allow a homogeneous load distribution thereon. Furthermore, as the sleeve covers the whole stem, seating of the assembly on the yoke is carried out by means of the sleeve, which does not have strength mechanical features suitable for this function, being apt to undergo a premature fatigue wear of the material in the assembly operation.

SUMMARY OF THE INVENTION

The invention provides a new mounting assembly for yokes in universal joints with which these disadvantages are overcome in a simple and effective way, and with which other additional advantages are obtained, as it will be fully detailed hereinafter.

As stated, the invention is applied particularly, but not exclusively, to the field of motor vehicles, for example in steering columns and other kinematic mechanisms involving universal joints for transmission of rotary motion having corresponding yokes with an open configuration, for example an U- or V-shaped cross section, between which wings a driving shaft is provided and in which respective holes are formed.

The mounting assembly of the present invention essentially comprises a clamp bolt having a head and a stem provided with several cylindrical portions. Said clamp bolt is arranged transversely to the wings of the yoke and it is received into the holes thereof. The assembly is further provided with a sleeve inside of which the clamp bolt is inserted so that, in an assembled position, the sleeve exerts a pressure on the surface of said driving shaft preventing it from being axially moved.

The main feature of the invention is the fact that the stem of said bolt has a first, cylindrical end threaded portion and a second, cylindrical adjacent not threaded portion. Said second, not threaded portion has a diameter that is slightly larger than the inner diameter of the sleeve. In this way, when inserting the clamp bolt inside the sleeve, it is expanded and its outer dimensions are increased against the surface of said driving shaft blocking it axially in position as it is pressed against the bottom of the yoke.

In one embodiment, the sleeve may have, in the outer surface thereof, a longitudinal flat portion to be in contact with the outer surface of the driving shaft which provides a good pressure and clamping force distribution. However, it is provided that the contact portion of the sleeve with the driving shaft may have different shapes and/or surface features depending on the loads and the features of the driving shaft.

Assembling of the mounting assembly in a clamping position is carried out by inserting the driving shaft into the yoke of the universal joint. Then, the mounting assembly formed by the clamp bolt and the sleeve is inserted through the holes in the wings of the yoke, and the bolt is then rotated. The bolt is screwed up into a nut located at the wing of the yoke opposed to the head thereof. It will be understood, however, that the nut may be avoided and replaced by a threaded portion formed directly on the wing of the yoke.

Rotation of the screw results in that the sleeve is forced to be inserted into the second, cylindrical not threaded portion of the bolt stem. As consequence that the outer diameter of said second, cylindrical not threaded portion of the bolt stem is slightly larger than the inner diameter of the sleeve, the stem is expanded and its outer dimensions are increased and therefore the driving shaft is axially retained in position, thus preventing or restraining its movement. This occurs as the sleeve imparts a force pressing the driving shaft against the bottom of the yoke, so that it becomes retained.

According to a further feature of the invention, the bolt stem is additionally provided with a third, cylindrical portion adjacent to the head thereof. It is a not threaded portion which purpose is to improve the seat of the bolt in the hole of the yoke wing. In this way, the sleeve is prevented from being damaged by wear resulting from action of fatigue (usually alternating for steering shafts), which allows for performing its function during the working life of the mechanism in which it is fitted, since said third, cylindrical portion of the stem provides a more consistent and durable support.

Thus, while in the prior art mounting assemblies the clamping force results from deformation of the sleeve carried by the bolt against the driving shaft itself, in the present invention said clamping force is caused by a dimensional increase or expansion of said sleeve caused by the clamp bolt with its second, not threaded portion, thus improving the effectiveness of the assembly.

BRIEF DESCRIPTION OF THE DRAWINGS

The features and the advantages of the mounting assembly for drive shafts in yokes of universal joints of the present invention will be clearer from the detailed description of a preferred embodiment thereof. This description will be given hereinafter by way of a non limitative example with reference to the drawings enclosed in the present specification.

In said drawings:

FIG. 1 is a perspective view of one embodiment of a mounting assembly for drive shafts in yokes of universal joints according to the present invention;

FIG. 2 is a side elevational cutaway view of the mounting assembly in FIG. 1;

FIG. 3 is a front elevational view of the mounting assembly in FIG. 1;

FIG. 4 is a side elevational cutaway view of the mounting assembly of the invention fitted in a yoke taken along line B-B' in FIG. 5, said assembly being shown in a position in which the bolt has not still been fitted into the yoke;

FIG. 5 is a part way front elevational cutaway view of the mounting assembly in FIG. 1 fitted in a, yoke taken along line A-A' in FIG. 4; and FIG. 6 is a side elevational cutaway view of the mounting assembly of the invention fitted taken along line B-B' in FIG. 5, said assembly being shown in an assembled position, causing the driving shaft to be axially retained.

DETAILED DESCRIPTION OF THE PREFERRED EMBODIMENT

The mounting assembly of the embodiment that is herein illustrated by way of an example in the figures has been indicated as a whole with reference numeral (1) and it is intended for holding a driving shaft (15), for example, in the steering column of a motor vehicle, wherein a grip-like clamping is carried out, also referred to as pinch bolt.

This driving shaft (15) is held in position by means of said grip-like clamping through the ends thereof in the yokes (2). Said yokes (2) have an open configuration, for example the yoke having a U-shaped cross section shown in the example of FIGS. 4, 5, and 6 of the drawings. A hole (5, 6) is formed respectively in each wing (3, 4) of said yoke (2). The holes (5) and (6) may be both inwardly smooth, or one or both could be threaded, as it will be described below. Between the wings (3, 4) of the yoke (2) said driving shaft (15) is arranged, which may be seen in cross section in FIGS. 4 and 6 of the drawings.

The mounting assembly (1) of the present invention essentially comprises a clamp bolt (8) which, as it may be seen from FIGS. 4 and 6, is arranged transversely to the wings (3, 4) of the yoke (2), housed into the holes (5, 6) thereof, in an assembled position shown in FIG. 6.

The mounting assembly (1) is also provided with a sleeve (13) formed by a body having a substantially hollow cylindrical configuration made of a resistant, but somewhat resilient, material to allow its expansion in an assembled position, as shown in FIG. 6. The sleeve (13) of the mounting assembly (1) is provided surrounding the stem of the bolt (8) outwardly. In the embodiment shown in the figures, the sleeve (13) is provided, in its outer surface, with a longitudinal, lower flat portion (13a), as shown in FIGS. 1, 3 and 5 of the drawings that are attached in the present specification. This longitudinal, lower flat portion (13a) is arranged in contact with the outer surface of the driving shaft (15). Although this flat configuration has been shown in the example embodiment of the figures, it will be however understood that this portion may have different shapes and/or surface features depending on the loads and the features of the driving shaft (15).

The clamp bolt (8) is provided with a head (9) and a stem having three cylindrical portions (10, 11, 12).

The first portion (10) is arranged facing the head (9) of the screw (8). It is a threaded portion which may be threadingly received into a threaded portion of the wing (3) of the yoke (2) or into a nut (14), for retaining the bolt (8) in position, as it may be seen from the views in FIGS. 4 and 6 of the drawings.

The second cylindrical portion (11) of the stem of the bolt (8) is arranged adjacent to the first portion (10) and it has a cylindrical, not threaded configuration, as it may be seen, which is suitably adapted to receive the sleeve (13) of the mounting assembly (1). This second, not threaded portion (11) has a diameter that is slightly larger than the inner diameter of said sleeve (13). With said slight difference in diameters it is possible that, when inserting the stem of the bolt (8) into the sleeve (13), it is expanded outwardly resulting in an increase of its dimensions. The expansion of the sleeve (13) when inserted into the bolt (8) in an assembled position as in FIG. 6 causes a force against the surface of the driving shaft (15) blocking it axially in position as it is pressed against the bottom of the yoke (2). The lower flat portion (13a) of the example embodiment of the sleeve (13) in the figures allows for providing a good pressure and clamping force distribution on the driving shaft (15).

The third, cylindrical portion (12) of the stem of the clamp bolt (8) is located adjacent to the head (9) thereof and it has a flat, cylindrical configuration, as clearly shown in FIG. 2 of the drawings. This third, cylindrical not threaded portion (12) acts as a seat for the bolt (8) in the hole (6) of the wing (4) in the yoke (2), and the sleeve (13) need not to carry out such an action, in contrast with the prior art.

For assembling the mounting assembly (1) of the invention, the operator first inserts the driving shaft (15) between the wings (3, 4) of the yoke (2), as shown in FIG. 4. Then, the mounting assembly (1), that is, the clamp bolt (8) and the sleeve (13), is inserted transversely to the wings (3) and (4) of the yoke (2) through their respective holes (5) and (6), and the bolt (8) is then rotated. The first portion (10) in the stem of the bolt (8) is screwed up into the nut (14) located in the wing (3) of the yoke (2) causing the sleeve (13) to be inserted into the second portion (11) of the stem in the clamp bolt (8). As stated before, on account of the outer diameter of said second, cylindrical portion (11) is slightly larger than the inner diameter of the sleeve (13), it is expanded making its outer dimensions become increase resulting in a pressure against the driving shaft (15) thus retaining it axially in position, preventing or restraining its movement in the yoke (2), since it is pressed against the bottom of the yoke (2), as shown in FIG. 6. As seen in FIG. 6, the sleeve (13) when in a working position may cover the largest part of the second portion (11) and part of the tapered portion (10).

Once having been sufficiently described what the mounting assembly (1) for drive shafts (15) in yokes (2) of universal joints of the present invention consists in accordance to the enclosed drawings, it will be understood that any detail modification can be introduced as appropriate, unless variations may alter the essence of the invention as summarised in the appended claims.

The invention claimed is:

1. A mounting assembly for a universal joint, comprising of:

a yoke including first and second wings between which a driving shaft is provided, said wings having respective holes;

a bolt having a head and a stem, and said bolt being arranged transversely to said wings; and a sleeve receiving the stem of said bolt so that, in an assembled position, said sleeve exerts a pressure on a surface of said driving shaft preventing its axial movement, wherein the stem of said bolt has at least a first, threaded end portion, a second, non-threaded adjacent portion, and a third portion, a diameter of said second portion being slightly larger than an inner diameter of said sleeve, so that when said bolt is inserted into said sleeve, said sleeve expands resulting in an increase of its outer dimensions against said surface of said driving shaft blocking it axially in position as it is pressed against said yoke, and said third portion of said bolt having a diameter slightly larger than said second portion, and said third portion of said bolt is received in one of said holes with no part of said third portion being covered by said sleeve, thereby seating said bolt with respect to said yoke.

2. A mounting assembly according to claim 1, wherein said sleeve includes an outer flat longitudinal portion that contacts the outer surface of said driving shaft.

3. A mounting assembly for a universal joint, comprising of:

a yoke including first and second wings having respective first and second holes, said first and second wings being configured to receive a driving shaft;

a bolt having a head, and having a stem receivable in said first and second holes, said bolt including a first threaded end portion, a second non-threaded portion adjacent to said first threaded end portion, and a third non-threaded end portion; and a sleeve disposed over said second non-threaded portion of said bolt wherein no portion of said sleeve is received in either of said first and second holes when said bolt is assembled with said yoke.

4. A mounting assembly according to claim 3, wherein said second non-threaded portion of said bolt has a diameter that is slightly greater than a diameter of said first threaded end portion, and said third non-threaded end portion has a diameter that is slightly greater than the diameter of the second non-threaded portion.

5. A mounting assembly according to claim 3, wherein said third non-threaded end portion of said bolt is received in one of said first and second holes, thereby seating said bolt with respect to said yoke.

6. A mounting assembly according to claim 3, wherein said sleeve includes an outer flat longitudinal portion that engages an outer surface of said drive shaft.

7. A mounting assembly according to claim 3, wherein said sleeve is located between interior faces of said first and second wings for exerting pressure against a surface of the driving shaft.

* * * * *